(12) United States Patent
Matsuyama et al.

(10) Patent No.: US 11,228,189 B2
(45) Date of Patent: Jan. 18, 2022

(54) LOADED BODY HOUSING DEVICE

(71) Applicant: Panasonic Intellectual Property Management Co., Ltd., Osaka (JP)

(72) Inventors: Yoshinari Matsuyama, Osaka (JP); Masaki Shikanai, Kanagawa (JP); Takeshi Kikuchi, Osaka (JP); Yuzuka Isobe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 56 days.

(21) Appl. No.: 16/864,727

(22) Filed: May 1, 2020

(65) Prior Publication Data

US 2020/0259348 A1     Aug. 13, 2020

Related U.S. Application Data

(63) Continuation of application No. PCT/JP2018/040972, filed on Nov. 5, 2018.

(30) Foreign Application Priority Data

Nov. 10, 2017     (JP) .............................. JP2017-216916

(51) Int. Cl.
*H02J 7/00* (2006.01)
*A47B 49/00* (2006.01)
(Continued)

(52) U.S. Cl.
CPC .......... *H02J 7/0045* (2013.01); *A47B 49/004* (2013.01); *B60L 50/66* (2019.02);
(Continued)

(58) Field of Classification Search
CPC ...... H02J 7/0045; A47B 49/004; B60L 50/66; H01M 2220/20; H01M 10/441; H01M 10/46; H01M 2/1007
(Continued)

(56) References Cited

U.S. PATENT DOCUMENTS 5,662,488 A  *  9/1997  Alden .................. H01R 13/625
                                                    439/314
7,632,126 B1 * 12/2009  Farole et al. ........ H01R 12/592
                                                    439/314
(Continued)

FOREIGN PATENT DOCUMENTS

JP         2015-15827         1/2015

OTHER PUBLICATIONS

International Search Report dated Dec. 18, 2018 in International (PCT) Application No. PCT/JP2018/040972.

*Primary Examiner* — Sun J Lin
(74) *Attorney, Agent, or Firm* — Wenderoth, Lind & Ponack, L.L.P.

(57) ABSTRACT

A loaded body housing device includes: an upper table which rotates about a rotation axis extending along a Z-axis and supports a plurality of batteries in a plurality of first storage spaces around the rotation axis; a lower table which rotates about a rotation axis extending along the Z-axis and supports a plurality of batteries in a plurality of second storage spaces around the rotation axis; and a casing having openings each of which exposes one storage space when viewed in a negative direction of the Z-axis. The upper table is positioned to have overlapping between a part of the plurality of first storage spaces and the plurality of second storage spaces and no overlapping between the plurality of first storage spaces and a second storage space when viewed in the negative direction of the Z-axis. A direction in which the rotation axis of the upper table and the rotation axis of the lower table are arranged to intersect with a direction in which the plurality of first storage spaces and the plurality of second storage spaces are arranged.

13 Claims, 11 Drawing Sheets

(51) Int. Cl.
*B60L 50/60* (2019.01)
*H01M 2/10* (2006.01)
*H01M 10/44* (2006.01)
*H01M 10/46* (2006.01)
*H01M 50/20* (2021.01)

(52) U.S. Cl.
CPC ......... *H01M 10/441* (2013.01); *H01M 10/46* (2013.01); *H01M 50/20* (2021.01); *H01M 2220/20* (2013.01)

(58) Field of Classification Search
USPC .......................................................... 320/107
See application file for complete search history.

(56) References Cited

U.S. PATENT DOCUMENTS 7,950,944 B1 * 5/2011 Hertzler et al. ...... H01R 13/639
439/314
9,187,004 B1 * 11/2015 Davis ....................... B60L 53/30

* cited by examiner

LOADED BODY HOUSING DEVICE

CROSS REFERENCE TO RELATED APPLICATIONS

This application is a U.S. continuation application of PCT International Patent Application Number PCT/JP2018/040972 filed on Nov. 5, 2018, claiming the benefit of priority of Japanese Patent Application Number 2017-216916 filed on Nov. 10, 2017, the entire contents of which are hereby incorporated by reference.

BACKGROUND

1. Technical Field

The present disclosure relates to loaded body housing devices.

2. Description of the Related Art

Conventionally, electric vehicles with a replaceable battery, such as electric automobiles and electric scooters, are known. When the remaining battery level of an electric vehicle drops low, replacing the battery of the electric vehicle by a charged battery at a battery station where replaceable batteries are stored allows the electric vehicle to continue to travel.

At the battery station, a battery that is low on charge is charged, but fast charging accelerates deterioration of the battery. In view of this, there is a disclosure of providing an estimated arrival time of the electric vehicle at the battery station and controlling, on the basis of the estimated arrival time, the charging speed for each battery stored in the battery station (Japanese Unexamined Patent Application Publication No. 2015-015827).

SUMMARY

Some electric vehicles include more than one battery; thus, it is desired that upon exchange of batteries, two or more (for example, two) batteries be taken out at a time from a housing device (loaded body housing device) in which charged batteries are housed. In addition, there are cases where two or more loaded body housing devices are installed, and thus downsizing of the loaded body housing device is desired.

In view of this, the present disclosure has an object to provide a downsized loaded body housing device from which two or more loaded bodies can be taken out.

In order to achieve the aforementioned object, a loaded body housing device according to one aspect of the present disclosure includes: a first rotating body which rotates about a first rotation axis extending along a first direction and supports a plurality of loaded bodies in a plurality of first storage spaces around the first rotation axis; a second rotating body which rotates about a second rotation axis extending along the first direction and supports a plurality of loaded bodies in a plurality of second storage spaces around the second rotation axis; and a casing which houses the first rotating body and the second rotating body, the casing having a first opening through which one of the plurality of first storage spaces is exposed when viewed in the first direction and a second opening through which one of the plurality of second storage spaces is exposed when viewed in the first direction. The first rotating body is positioned to have overlapping between a part of the plurality of first storage spaces and the plurality of second storage spaces and have no overlapping between the plurality of first storage spaces and a second storage space exposed through the second opening when viewed in the first direction, and a second direction in which the first rotation axis and the second rotation axis are arranged intersects with a third direction in which a first storage space exposed through the first opening and the second storage space exposed through the second opening are arranged when viewed in the first direction.

The present disclosure can provide a downsized loaded body housing device from which two or more loaded bodies can be taken out.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
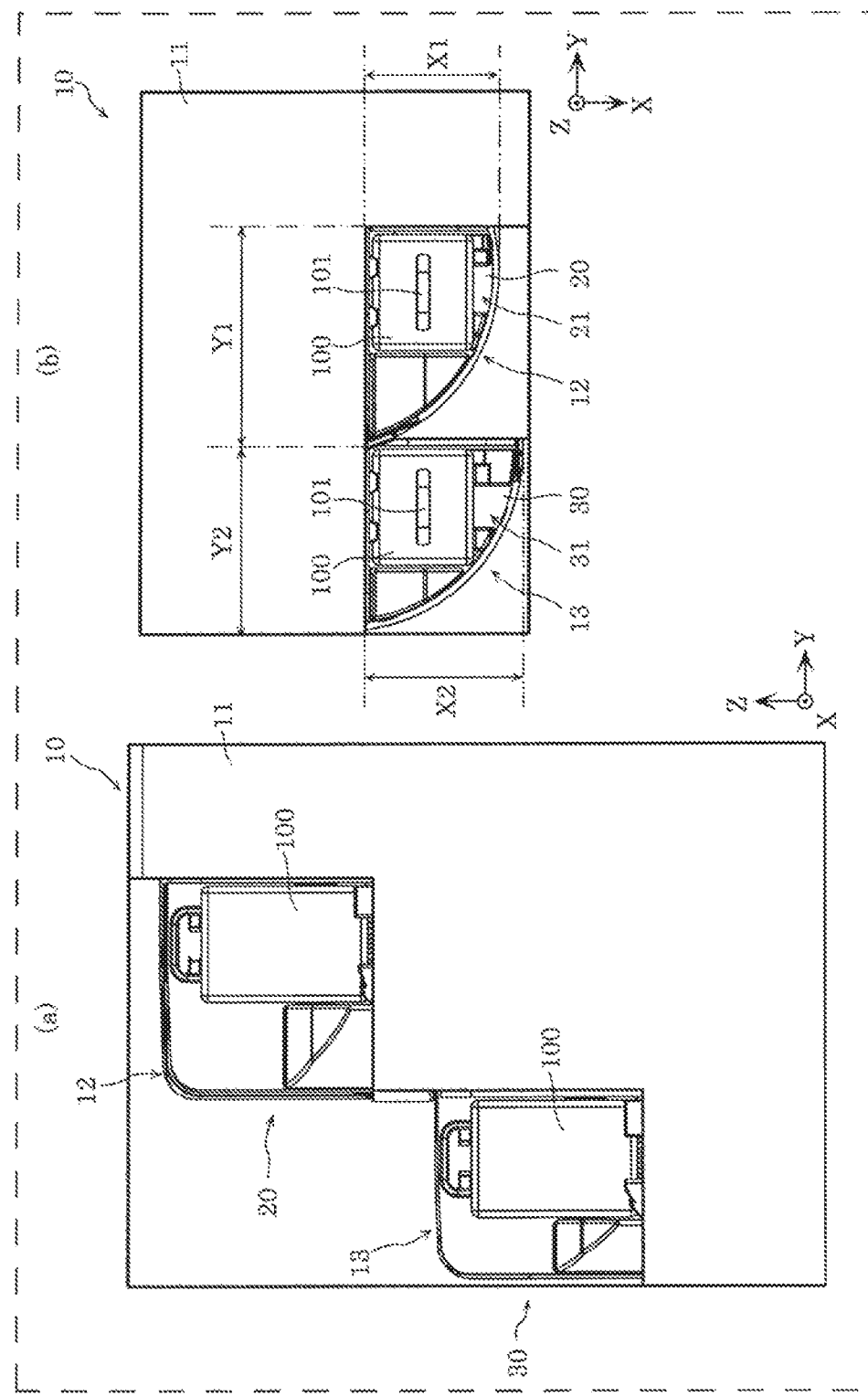
FIG. 1 is an external view of a loaded body housing device according to an embodiment.

Hereinafter, an embodiment will be described in detail with reference to the drawings where appropriate. However, there are instances where overly detailed description will be omitted. For example, there are cases where detailed description of well-known matter or overlapping description of substantially identical elements will be omitted. This is in order to prevent the subsequent description from becoming overly verbose and to facilitate the understanding of a person having ordinary skill in the art.

Note that the accompanying drawings and the subsequent description have been provided by the inventors in order for a person having ordinary skill in the art to sufficiently understand the present disclosure, and thus they are not intended to limit the scope of the subject matter of the appended Claims.

Note that the figures are schematic diagrams and are not necessarily precise illustrations. Furthermore, in the figures, substantially identical elements are assigned the same reference signs, and overlapping description may be omitted or simplified.

In the drawings used to describe the following embodiment, there are cases where coordinate axes are illustrated. The Z-axis represents a direction substantially orthogonal to an installation surface on which the loaded body housing device is installed, and the negative direction of the Z-axis represents a direction to the installation surface. The X-axis and the Y-axis are orthogonal to each other in a plane perpendicular to the Z-axis. For example, in the following embodiment, "plan view" means seeing an area located in the negative direction of the Z-axis from an area located in the positive direction of the Z-axis.

Note that the term "substantially/approximately XX" is intended to encompass XX that is virtually recognized as XX; for example, "substantially rectangular" is intended to include not only perfectly rectangular, but also a shape that can be substantially recognized as rectangular.

Embodiment

Hereinafter, a loaded body housing device according to the present embodiment will be described with reference to FIG. 1 to FIG. 11. An example in which the loaded body housing device is installed at a battery station or the like and houses and charges a battery to be mounted on an electric vehicle will be described below. The loaded body housing device is, for example, installed outdoors. An installation surface on which the loaded body housing device is installed is, for example, the ground.

[1-1. Configuration of Loaded Body Housing Device]

First, the configuration of loaded body housing device 10 will be described with reference to FIG. 1 to FIG. 10.

FIG. 1 is an external view of loaded body housing device 10 according to the present embodiment. Specifically, (a) in FIG. 1 is a front view of loaded body housing device 10, and (b) in FIG. 1 is a plan view of loaded body housing device 10. Note that loaded body housing device 10 includes a shutter to be described later; (a) and (b) in FIG. 1 illustrate the state where the shutter is open.

As illustrated in (a) and (b) in FIG. 1, loaded body housing device 10 houses a battery to be mounted on an electric vehicle or the like. Loaded body housing device 10 includes casing 11 and openings 12 and 13 formed in casing 11. Furthermore, loaded body housing device 10 houses upper table 20 and lower table 30. Note that, for example, when taking out battery 100, a user is at a position in the positive direction of the X-axis relative to loaded body housing device 10 illustrated in (b) in FIG. 1. Hereinafter, the situation of a user being at a position in the positive direction of the X-axis relative to loaded body housing device 10 will be described as a user being in front of loaded body housing device 10.

Casing 11 houses upper table 20 and lower table 30. As illustrated in (a) in FIG. 1, casing 11 houses upper table 20 and lower table 30 at different positions when viewed along the Z-axis. In other words, casing 11 does not house upper table 20 and lower table 30 in the same plane. In the present embodiment, casing 11 houses upper table 20 at a higher position than lower table 30 relative to the installation surface. Note that the material of casing 11 is not necessarily limited; for example, casing 11 is formed from a metal or resin material.

As illustrated in (b) in FIG. 1, casing 11 has opening 12 through which battery 100 supported by upper table 20 is exposed and opening 13 through which battery 100 supported by lower table 30 is exposed. When viewed in plan view, battery 100 supported by upper table 20 is exposed through opening 12. In other words, opening 12 places battery 100 supported by upper table 20 in a visible state when viewed in plan view. When viewed in plan view, battery 100 supported by lower table 30 is exposed through opening 13. In other words, opening 13 places battery 100 supported by lower table 30 in a visible state when viewed in plan view. Note that the direction from an area in the positive direction of the Z-axis to an area in the negative direction of the Z-axis (that is, the negative direction of the Z-axis) is one example of the first direction.

Although details will be described later, upper table 20 includes a plurality of storage spaces (refer to storage spaces 21 in FIG. 5) for supporting battery 100; for example, battery 100 is supported in each of the plurality of storage spaces. This means that upper table 20 supports a plurality of batteries 100. Opening 12 exposes only one of the plurality of batteries 100 supported by upper table 20. In other words, when viewed in plan view, opening 12 exposes only one of the plurality of storage spaces included in upper table 20.

Furthermore, although details will be described later, lower table 30 includes a plurality of storage spaces (refer to storage spaces 31 in FIG. 7) for supporting battery 100; for example, battery 100 is supported in each of the plurality of storage spaces. This means that lower table 30 supports a plurality of batteries 100. Opening 13 exposes only one of the plurality of batteries 100 supported by lower table 30. In other words, when viewed in plan view, opening 13 exposes only one of the plurality of storage spaces included in lower table 30. Note that in the present embodiment, opening 13 is disposed at a lower position than opening 12 relative to the installation surface.

As illustrated in (b) in FIG. 1, openings 12, 13 are substantially fan-shaped when viewed in plan view. For example, when viewed in plan view, openings 12, 13 have different external shapes. Specifically, length X1 of opening 12 along the X-axis is shorter than length X2 of opening 13 along the X-axis. Furthermore, length Y1 of opening 12 along the Y-axis is greater than length Y2 of opening 13 along the Y-axis. Opening 12 is larger than opening 13 when viewed in plan view, for example. In other words, opening 12 disposed at a high position relative to the installation surface is larger than opening 13 disposed at a lower position than opening 12. Here, being large means having a larger area when viewed in plan view. Although opening 12 is larger than opening 13 in the present embodiment, this is not limiting; opening 12 may be smaller than opening 13 or may have the same area as the area of opening 13.

Note that as illustrated in (a) in FIG. 1, each of openings 12 and 13 is formed to further expose a surface of battery 100 that is in the positive direction of the X-axis in the present embodiment. Specifically, opening 12 exposes a surface facing the positive direction of the X-axis among the surfaces of battery 100 disposed on upper table 20, and opening 13 exposes a surface facing the positive direction of the X-axis among the surfaces of battery 100 disposed on lower table 30. In other words, among the side surfaces of battery 100, a surface in a direction in which a user who is replacing batteries 100 is present is exposed through each of openings 12, 13.

Furthermore, as illustrated in (b) in FIG. 1, openings 12, 13 are arranged side by side when viewed in plan view. For example, openings 12, 13 are arranged side by side along the Y-axis. Some electric vehicles include more than one battery 100; when openings 12, 13 are arranged side by side, a user can take out two batteries 100 at a time. This improves the workability in replacing batteries 100. Note that opening 12 is one example of the first opening, and opening 13 is one example of the second opening.

Each of upper table 20 and lower table 30 is a support body which supports the plurality of batteries 100. Although details will be described later, each of upper table 20 and lower table 30 rotates about a line parallel to the Z-axis as an axis of rotation. Thus, each of upper table 20 and lower table 30 allows the plurality of batteries 100 supported thereon to be sequentially exposed. Note that upper table 20 is one example of the first rotating body, and lower table 30 is one example of the second rotating body.

Note that upper table 20 rotates, for example, using a supporter (not illustrated in the drawings) which rotatably supports upper table 20 and a motor (not illustrated in the drawings) which rotates upper table 20. Lower table 30 rotates, for example, using a supporter (not illustrated in the drawings) which rotatably supports lower table 30 and a motor (not illustrated in the drawings) which rotates lower table 30. The supporter is not necessarily limited as long as the supporter rotatably supports upper table 20 or lower table 30; for example, the supporter is a plurality of wheels.

Upper table 20 is disposed in a position that does not overlap with opening 13 when viewed in plan view. In other words, when viewed in plan view, upper table 20 is disposed in a position that does not overlap with battery 100 exposed through opening 13 among batteries 100 supported by lower table 30. Thus, when viewed in plan view, each of batteries 100 supported by upper table 20 and lower table 30 is visible to and can be taken out by a user. Although details will be described later, the present disclosure is characterized by the positional relationship between upper table 20 and lower table 30 when viewed in plan view.

Battery 100 is a rechargeable battery mounted on an electric vehicle. Here, the electric vehicle is a mobile body which moves by driving a motor and the like with electricity supplied from battery 100. Examples of the electric vehicle include vehicles such as electric automobiles and electric scooters and aerial vehicles such as drones.

Battery 100 is substantially rectangular in plan view. For example, battery 100 is substantially cuboid. Note that handle 101 is formed on a surface of battery 100 that is in the positive direction of the Z-axis. The plurality of batteries 100 are housed in loaded body housing device 10; as an example, the plurality of batteries 100 are substantially the same in size and shape. The height of battery 100 (the length thereof along the Z-axis) is approximately 30 cm. Note that battery 100 is one example of the loaded body.

Here, the external appearance of loaded body housing device 10 with the shutter closed will be described with reference to FIG. 2.

Figure 2:
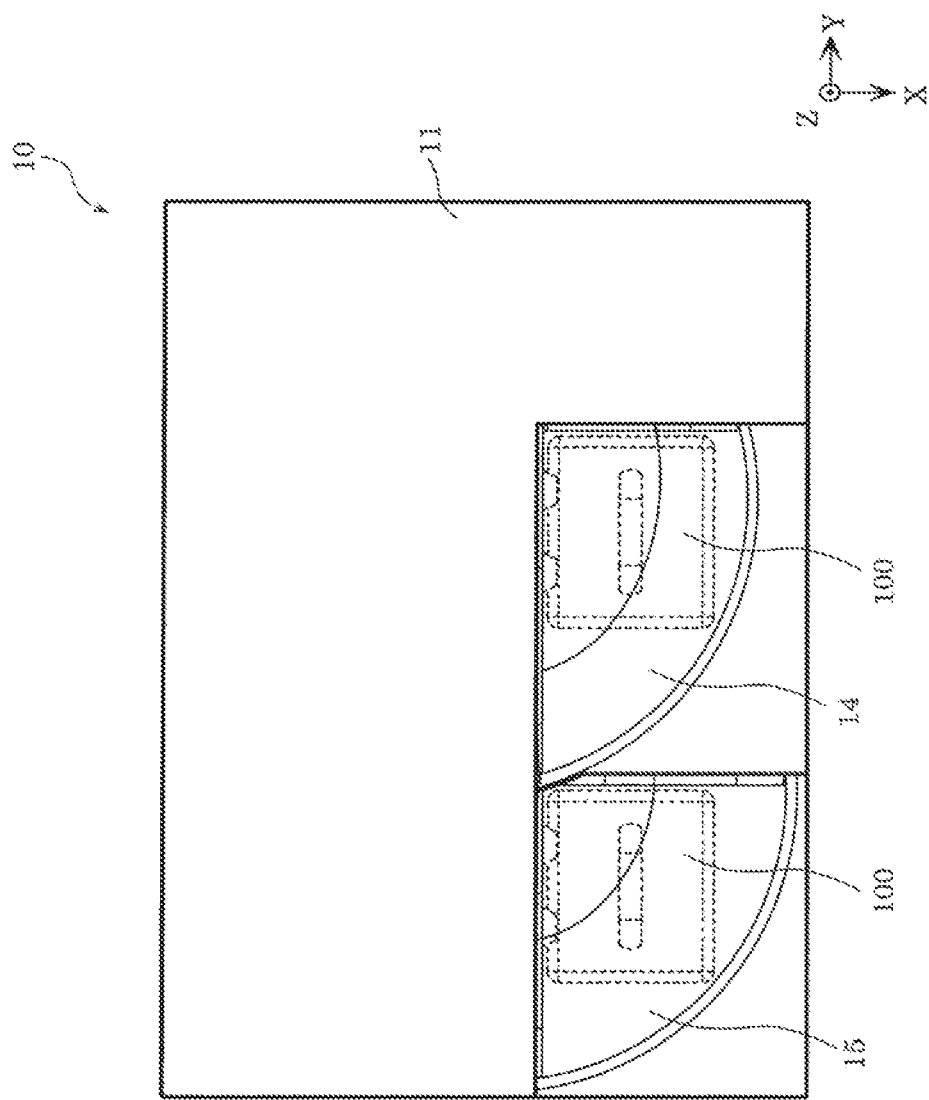
FIG. 2 is an external plan view of a loaded body housing device according to an embodiment with a shutter closed.

FIG. 2 is an external plan view of loaded body housing device 10 according to the present embodiment with shutters 14, 15 closed. Note that the state where shutters 14, 15 of loaded body housing device 10 are closed is, for example, the state where no user is present in front of loaded body housing device 10 or the state where upper table 20 and lower table 30 are rotating.

As illustrated in FIG. 2, loaded body housing device 10 includes two shutters 14, 15. Shutter 14 is movable along the outer perimeter of upper table 20 and opens and closes opening 12. Since upper table 20 is substantially circular in plan view, shutter 14 opens and closes opening 12 by rotating along the perimeter of upper table 20. Shutter 14 is one example of the first shutter.

Shutter 15 is movable along the outer perimeter of lower table 30 and opens and closes opening 13. Since lower table 30 is substantially circular in plan view, shutter 15 opens and closes opening 13 by rotating along the perimeter of lower table 30. Shutter 15 is one example of the second shutter.

In FIG. 2, each of shutters 14, 15 covers the top of battery 100, but also covers the sides of battery 100. In other words, batteries 100 with shutters 14, 15 closed are not visible from the outside.

Shutters 14, 15 are substantially fan-shaped in plan view, but this is not limiting; the shape of shutters 14, 15 may be determined, as appropriate, according to the shape of openings 12, 13.

Furthermore, although details will be described later, a connector (refer to connector 50 in FIG. 6) for charging battery 100 by supplying electricity thereto is disposed in each of the storage spaces included in upper table 20 and lower table 30. Battery 100 is electrically connected to the connector disposed in the storage space, and thus battery 100 is charged. A charging circuit (not illustrated in the drawings) for supplying electricity to the connector is housed in casing 11. Loaded body housing device 10 is connected to an external power supply (for example, commercial power supply), and the charging circuit converts electricity supplied from the external power supply into desired electricity for charging battery 100. For example, the charging circuit is provided in each of a plurality of connectors in one-to-one correspondence.

Next, controller 40 will be described with reference to FIG. 3.

Figure 3:
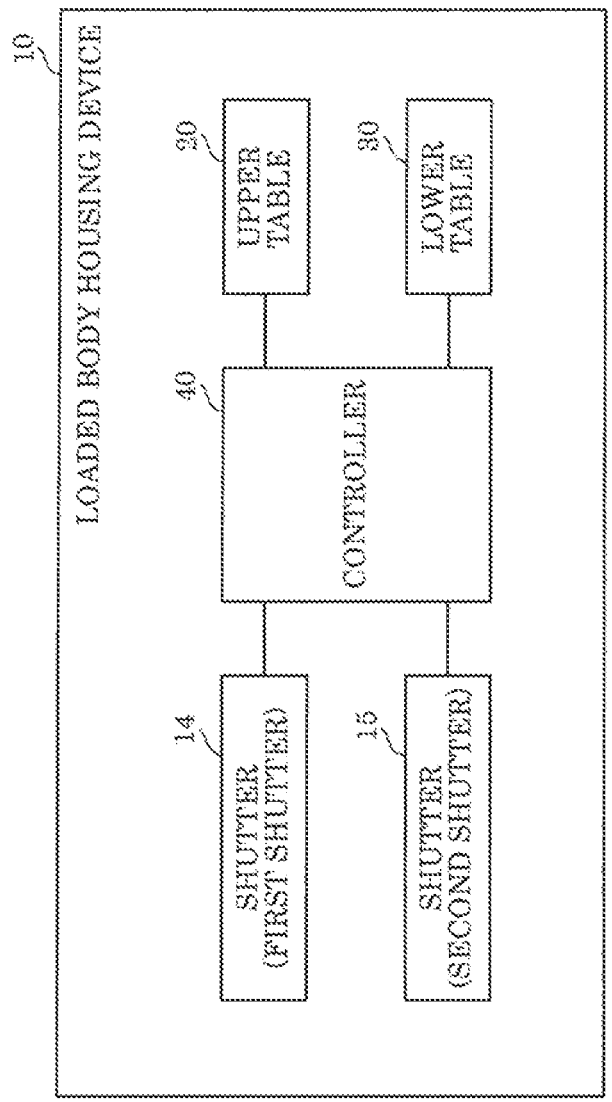
FIG. 3 is a block diagram illustrating the functional configuration of a loaded body housing device according to an embodiment.

FIG. 3 is a block diagram illustrating the functional configuration of loaded body housing device 10 according to the present embodiment.

As illustrated in FIG. 3, loaded body housing device 10 includes shutters 14,15, upper table 20, lower table 30, and controller 40.

Controller 40 is a control device which controls each structural element. Specifically, controller 40 controls a motor (not illustrated in the drawings) to rotate upper table 20 and lower table 30. For example, controller 40 controls the motor so that upper table 20 and lower table 30 rotate at intervals of a predetermined degree of rotation. Furthermore, controller 40 controls the motor to open and close shutters 14, 15. For example, controller 40 performs control to open and close openings 13, 14.

For example, loaded body housing device 10 may include an obtainer (not illustrated in the drawings) which obtains user input, and controller 40 may obtain the user input to control each motor. Loaded body housing device 10 may include a sensor (not illustrated in the drawings) which senses the presence or absence of a user in front of loaded body housing device 10, and controller 40 may control each motor according to the sensing result of the sensor.

Note that controller 40 is not limited to controlling each motor and may control other structural elements. For example, when battery 100 that is low on charge is housed, controller 40 may control the charging circuit to start charging of battery 100.

Controller 40 includes a microcomputer. Controller 40 includes, for example: non-volatile memory in which a control program for a motor, etc., is stored; volatile memory which is a transitory storage region for executing a program; an input/output port; and a processor which executes the program.

Note that controller 40 may include a dedicated circuit. Controller 40 is housed in casing 11, for example.

[1-2. Configurations of Upper Table and Lower Table]

Next, upper table 20 and lower table 30 will be described with reference to FIG. 4 to FIG. 9. First, upper table 20 will be described with reference to FIG. 4 and FIG. 5.

Figure 4:
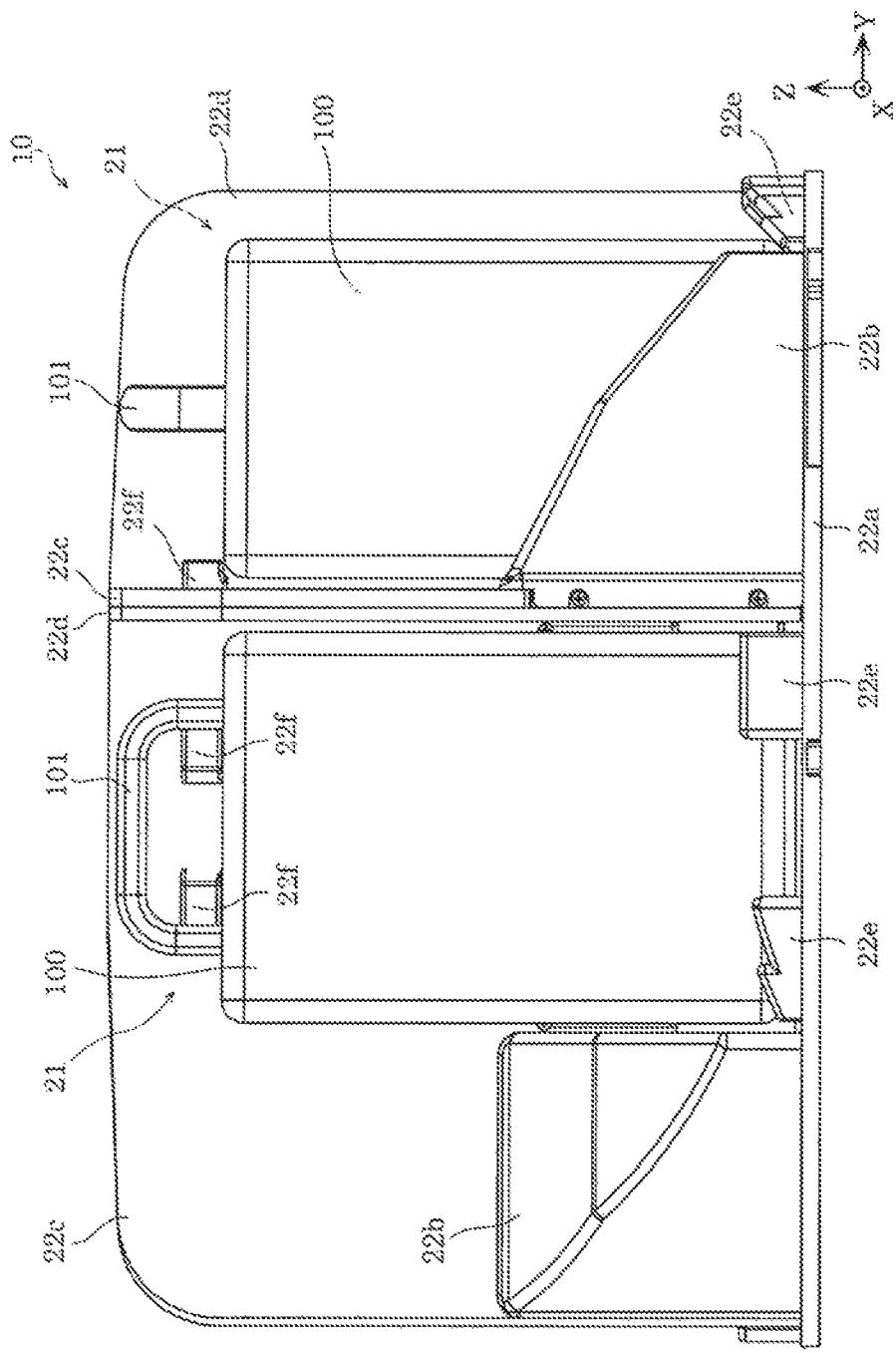
FIG. 4 is a front view illustrating the configuration of an upper table according to an embodiment.
Figure 5:
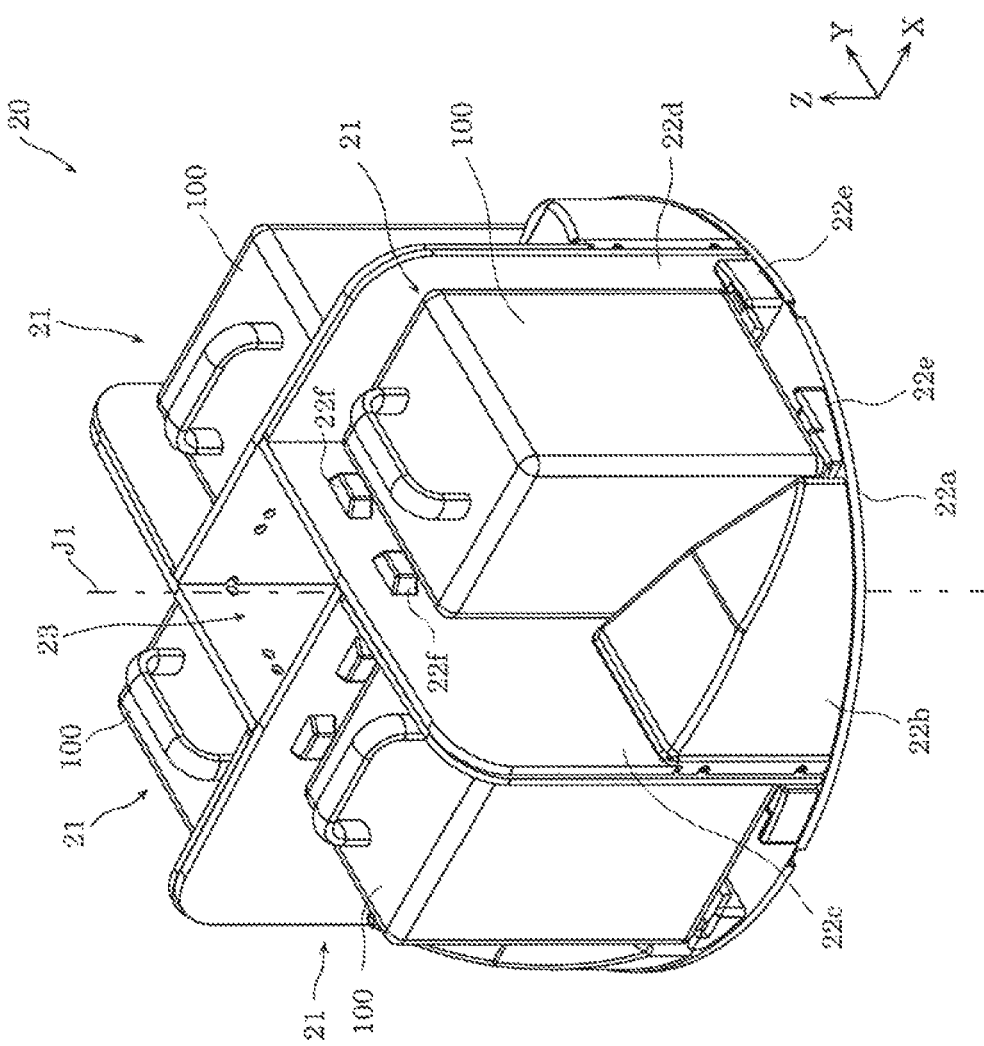
FIG. 5 is a perspective view illustrating the configuration of an upper table according to an embodiment.

FIG. 4 is an external front view of upper table 20 according to the present embodiment. FIG. 5 is an external perspective view of upper table 20 according to the present embodiment. Note that the plurality of batteries 100 disposed on upper table 20 are the same batteries (for example, batteries of the same size).

As illustrated in FIG. 4 and FIG. 5, upper table 20 includes bottom portion 22a and wall portions 22b-22d. Bottom portion 22a and wall portions 22b-22d form storage space 21 in which battery 100 is supported.

Bottom portion 22a is a mounting pedestal on which batteries 100 are placed. For example, bottom portion 22a is formed to be substantially circular in plan view.

Wall portions 22b-22d are walls which are formed extending from bottom portion 22a in the positive direction of the Z-axis and restrict the movement of batteries 100. Focusing on battery 100 disposed in storage space 21 at opening 12 when viewed in plan view, wall portion 22b restricts the movement of said battery 100 in the negative direction of the Y-axis, wall portion 22c restricts the movement of said battery 100 in the negative direction of the X-axis (for example, toward rotation axis J1), and wall portion 22d restricts the movement of said battery 100 in the positive direction of the Y-axis.

Wall portion 22b is, for example, substantially fan-shaped in plan view. The are section of wall portion 22b is formed along the outer diameter of bottom portion 22a. Note that a surface of wall portion 22b on the side on which battery 100 is disposed (surface in the positive direction of the Y-axis) is flat. For example, wall portion 22c is substantially in the shape of a rectangle extending along the Y-axis in plan view. Wall portion 22c is plate-like, for example. Wall portion 22d is, for example, substantially in the shape of a rectangle extending along the X-axis in plan view. Wall portion 22d is plate-like, for example.

With wall portions 22b-22d, battery 100 is easily positioned upon placing battery 100 in storage space 21.

Furthermore, aside from those mentioned above, projecting portion 22e and projecting portion 22f are provided on bottom portion 22a and wall portion 22c, respectively, as elements for restricting the movement of battery 100. Projecting portion 22e is disposed in a position close to the outer periphery of bottom portion 22a. For example, two projecting portions 22e are disposed. Projecting portion 22e restricts the movement of battery 100 in the positive direction of the X-axis and functions as a guide for housing battery 100 in storage space 21. For example, upon housing battery 100 in storage space 21, a user may bring battery 100 into contact with projecting portion 22e and then push battery 100 in the negative direction of the X-axis to house battery 100 in storage space 21. Projecting portion 22f protrudes from wall portion 22c toward an area in which battery 100 is disposed. For example, two projecting portions 22f are disposed. As illustrated in FIG. 4, projecting portion 22f is disposed in a position corresponding to an upper end portion (portion in the positive direction of the Z-axis) of battery 100 in the state where battery 100 is disposed. This allows projecting portion 22f to restrict the movement of battery 100 along the Z-axis.

FIG. 5 illustrates an example in which four storage spaces 21 are formed on upper table 20; the number of storage spaces 21 to be formed may be determined, as appropriate, according to the size, etc., of upper table 20 and battery 100. Note that storage space 21 is one example of the first storage space.

Furthermore, although details will be described later, a connector for charging battery 100 by supplying electricity thereto is disposed on bottom portion 22a in the negative direction of the Z-axis.

Furthermore, as described above, upper table 20 rotates about rotation axis J1 extending along the Z-axis. For example, rotation axis J1 passes through the position of the center of gravity of upper table 20 when viewed in plan view and is parallel to the Z-axis. The power of the motor and the rotation of the supporter allow upper table 20 to rotate about rotation axis J1. The plurality of storage spaces 21 described above are formed around rotation axis J1. Note that rotation axis J1 is one example of the first rotation axis.

Furthermore, as illustrated in FIG. 5, upper table 20 has through-hole 23 at a position surrounded by the plurality of storage spaces 21 when viewed in plan view. Specifically, upper table 20 has through-hole 23 formed surrounded by the plurality of wall portions 22c. Wiring (not illustrated in the drawings) for supplying electricity from the charging circuit to the connector is inserted through through-hole 23. In the present embodiment, through-hole 23 which is substantially rectangular in plan view is formed, but the shape of through-hole 23 is not limited to this example. The shape of through-hole 23 in plan view is determined, as appropriate, according to the number of wall portions 22c, i.e., the number of storage spaces 21.

Next, the shape of storage space 21 will be described in detail with reference to FIG. 6.

Figure 6:
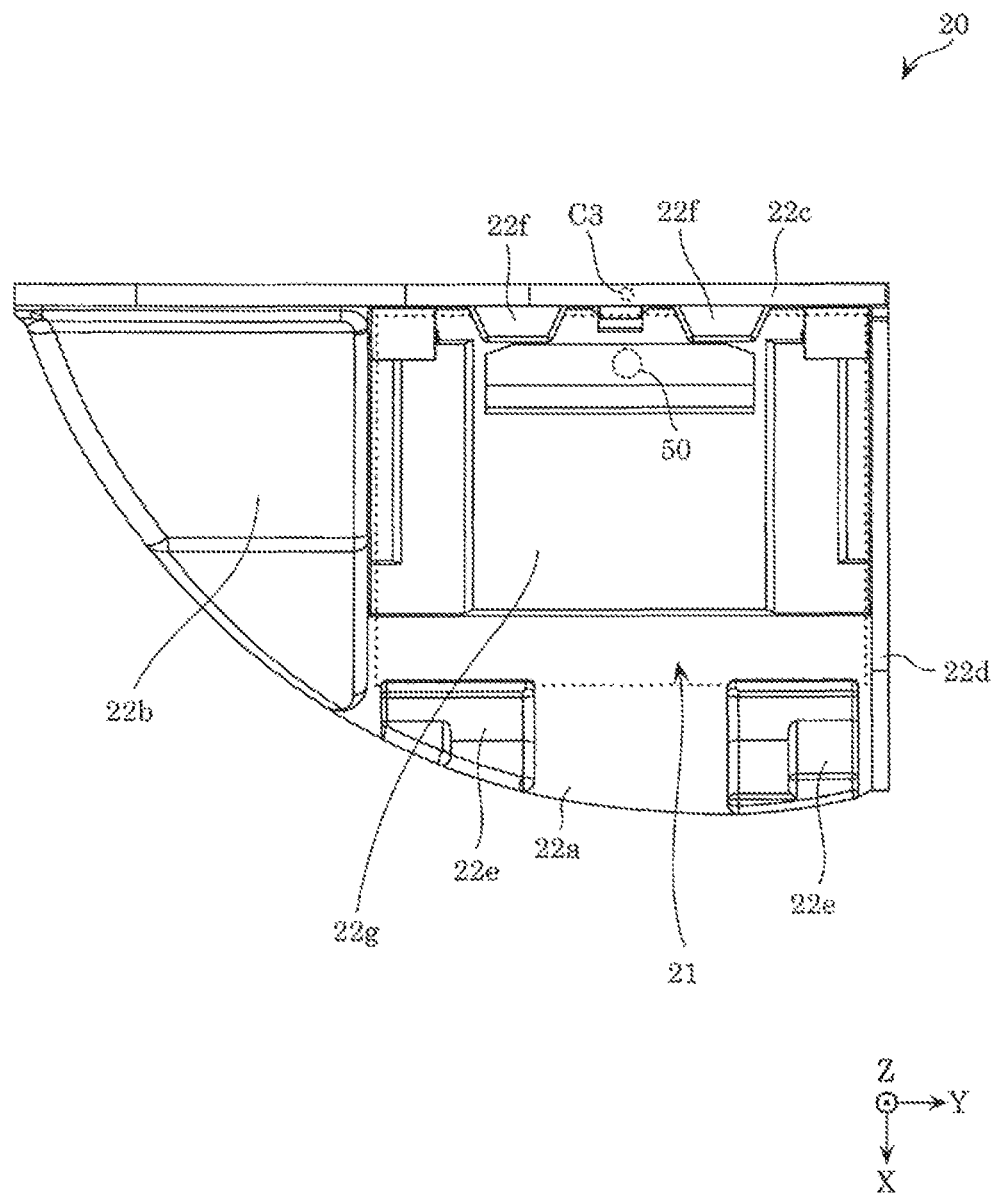
FIG. 6 is a plan view illustrating an upper table when no battery is housed.

FIG. 6 is a plan view illustrating upper table 20 when no battery 100 is housed. Note that in FIG. 6, when viewed in plan view, storage space 21 exposed through opening 12 among the plurality of storage spaces 21 is illustrated. The dashed line in the drawing indicates storage space 21 in plan view.

As illustrated in FIG. 6, storage space 21 is, for example, the space surrounded by wall portions 22b-22d and a virtual line connecting ends of two projecting portions 22e that are located in the negative direction of the X-axis when viewed in plan view. In other words, the shape of storage space 21 is substantially the same as the shape of battery 100 when viewed in plan view. In the present embodiment, the external shape of storage space 21 in plan view is substantially rectangular. Note that as illustrated in FIG. 5, upper table 20 includes four storage spaces 21 each of which has the shape illustrated in FIG. 6. In other words, four storage spaces 21 of the upper table 20 have substantially the same shape when viewed in plan view. The shape of storage space 21 is, for example, substantially cuboid.

Connector 50 is disposed on cover portion 22g, which is provided on bottom portion 22a, in the negative direction of the Z-axis. Cover portion 22g provides protection such that a user does not touch connector 50 in the state where battery 100 is not housed. When battery 100 is housed in storage space 21, cover portion 22g allows battery 100 and connector 50 to connect to each other. Note that cover portion 22g may be omitted.

Next, lower table 30 will be described with reference to FIG. 7.

Figure 7:
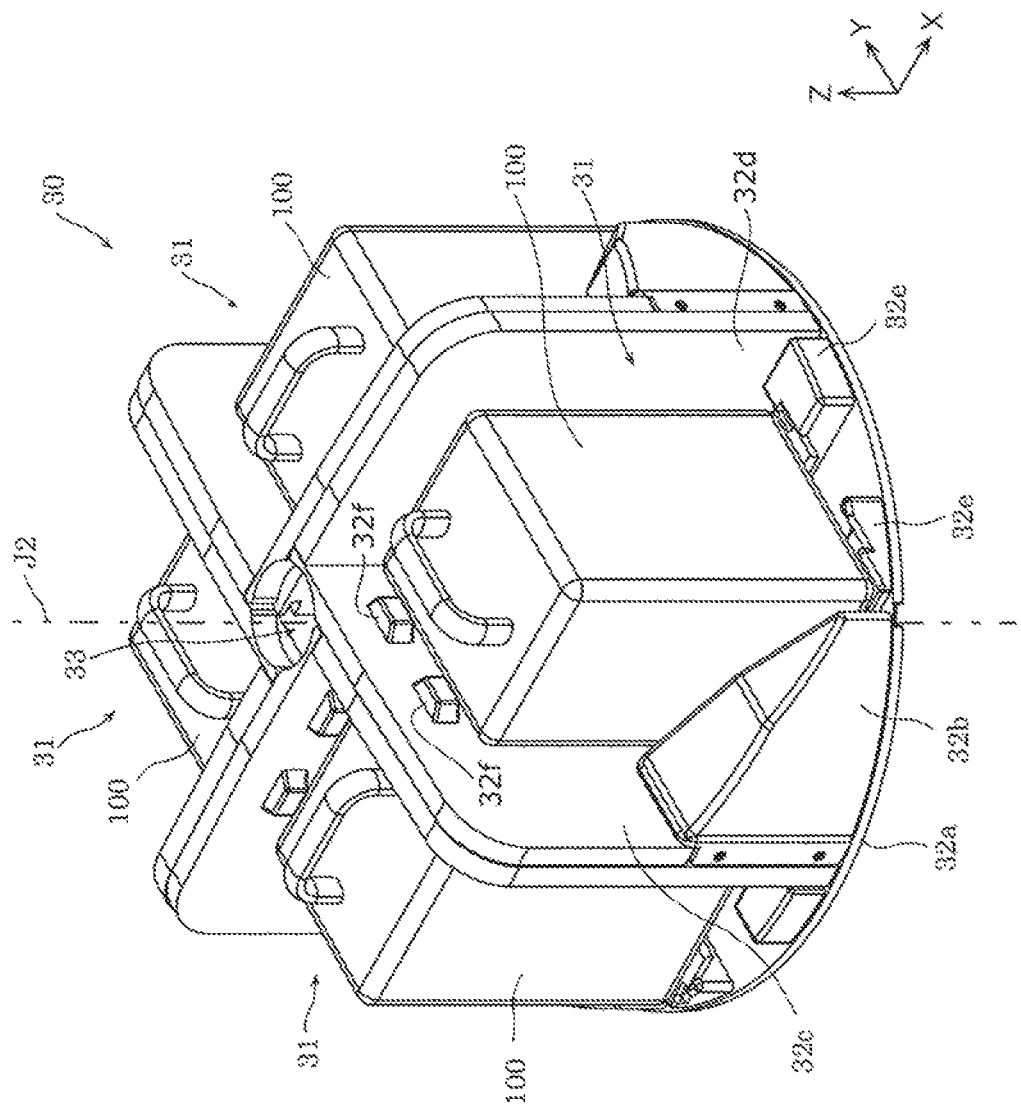
FIG. 7 is a perspective view illustrating the configuration of a lower table according to an embodiment.

FIG. 7 is an external perspective view of lower table 30 according to the present embodiment. Note that the plurality of batteries 100 disposed on lower table 30 are the same batteries (for example, batteries of the same size). The same batteries 100 (for example, batteries of the same size) are disposed on upper table 20 and lower table 30.

As illustrated in FIG. 7, lower table 30 includes bottom portion 32a and wall portions 32b-32d. Bottom portion 32a and wall portions 32b-32d form storage space 31 in which battery 100 is supported.

Bottom portion 32a is a mounting pedestal on which batteries 100 are placed. Bottom portion 32a is formed to be substantially circular in plan view.

Wall portions 32b-32d are walls which are formed extending from bottom portion 32a in the positive direction of the Z-axis and restrict the movement of batteries 100. Focusing on battery 100 disposed in storage space 31 at opening 13 when viewed in plan view, wall portion 32b restricts the movement of said battery 100 in the negative direction of the Y-axis, wall portion 32c restricts the movement of said battery 100 in the negative direction of the X-axis (for example, toward rotation axis J2), and wall portion 32d restricts the movement of said battery 100 in the positive direction of the Y-axis.

Wall portion 32b is, for example, substantially fan-shaped in plan view. The are section of wall portion 32b is formed along the outer diameter of bottom portion 32a. Note that a surface of wall portion 32b on the side on which battery 100 is disposed (surface in the positive direction of the Y-axis) is flat. For example, wall portion 32c is substantially in the shape of a rectangle extending along the Y-axis in plan view. Wall portion 32c is plate-like, for example. Wall portion 32d is, for example, substantially in the shape of a rectangle extending along the X-axis in plan view. Wall portion 32d is plate-like, for example.

With wall portions 32b-32d, battery 100 is easily positioned upon placing battery 100 in storage space 31. Note that when viewed in plan view, the direction in which wall portion 22c extends and the direction in which wall portion 32c extends are substantially parallel, and the direction in which wall portion 22d extends and the direction in which wall portion 32d extends are substantially parallel.

Furthermore, aside from those mentioned above, projecting portion 32e and projecting portion 32f are provided on bottom portion 32a and wall portion 32c, respectively, as elements for restricting the movement of battery 100. Projecting portions 32e, 32f are substantially the same as projecting portions 22e, 22f of upper table 20 and therefore, description thereof is omitted.

FIG. 7 illustrates an example in which four storage spaces 31 are formed on lower table 30; the number of storage spaces 31 to be formed may be determined, as appropriate, according to the size, etc., of lower table 30 and battery 100. The number of storage spaces 21, 31 may be determined so that the number of storage spaces 21 formed on upper table 20 and the number of storage spaces 31 formed on lower table 30 become equal. Storage space 31 is one example of the second storage space.

Furthermore, a connector for charging battery 100 by supplying electricity thereto is disposed on bottom portion 32a in the negative direction of the Z-axis.

Furthermore, as described above, lower table 30 rotates about rotation axis J2 extending along the Z-axis. For example, rotation axis J2 passes through the position of the center of gravity of lower table 30 when viewed in plan view and is parallel to the Z-axis. The power of the motor and the rotation of the supporter allow lower table 30 to rotate about rotation axis J2. Storage spaces 31 described above are formed around rotation axis J2. Note that rotation axis J2 is one example of the second rotation axis.

Furthermore, lower table 30 has through-hole 33 at a position surrounded by the plurality of storage spaces 31 when viewed in plan view. Specifically, lower table 30 has through-hole 33 formed surrounded by the plurality of wall portions 32c. Wiring (not illustrated in the drawings) for supplying electricity from the charging circuit to the connector is inserted through through-hole 33. In the present embodiment, through-hole 33 which is substantially rectangular in plan view is formed, but the shape of through-hole 33 is not limited to this example. The shape of through-hole 33 in plan view is determined, as appropriate, according to the number of wall portions 32c, i.e., the number of storage spaces 31.

Note that as illustrated in FIG. 5 and FIG. 7, through-hole 23 is larger than through-hole 33 when viewed in plan view. Through-hole 23 of upper table 20 which is disposed at a high position relative to the installation surface is larger than through-hole 33 of lower table 30 which is disposed closer to the installation surface than upper table 20 is.

Here, the shape of storage space 31 will be described. Storage space 31 is defined in the same manner as storage space 21 illustrated in FIG. 6. Storage space 31 is, for example, the space surrounded by wall portions 32b-32d and a virtual line connecting ends of two projecting portions 32e that are located in the negative direction of the X-axis when viewed in plan view. In other words, the shape of storage space 31 is substantially the same as the shape of battery 100 when viewed in plan view. In the present embodiment, storage space 31 is substantially rectangular. Note that as illustrated in FIG. 7, lower table 30 includes four storage spaces 31 which have substantially the same shape when viewed in plan view. Furthermore, in the present embodiment, since batteries 100 of the same shape are housed in upper table 20 and lower table 30, the shape of storage space 31 in plan view is substantially the same as the shape of storage space 21 in plan view. The shape of storage space 31 is, for example, substantially cuboid.

Next, the positions of upper table 20 and lower table 30 will be described with reference to FIG. 8.

Figure 8:
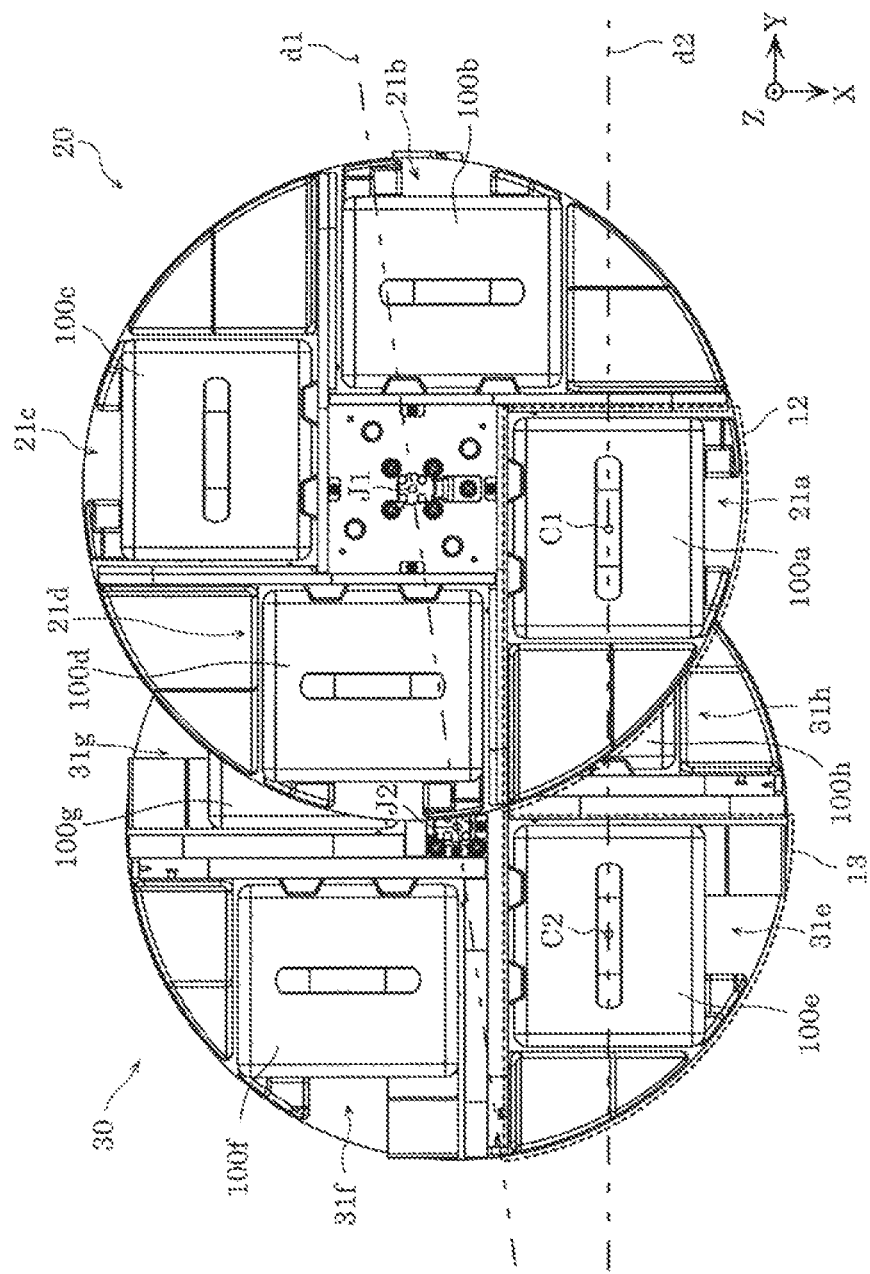
FIG. 8 is a plan view illustrating the positional relationship of an upper table and a lower table according to an embodiment.

FIG. 8 is a plan view illustrating the positional relationship of upper table 20 and lower table 30 according to the present embodiment. Specifically, FIG. 8 illustrates loaded body housing device 10 in (b) in FIG. 1 with upper table 20 and lower table 30 removed. In the drawing, the dashed line on upper table 20 indicates opening 12, and the dashed line on lower table 30 indicates opening 13.

As illustrated in FIG. 8, upper table 20 includes four storage spaces 21a-21d in which batteries 100a-100d are disposed. When loaded body housing device 10 is viewed in plan view, only battery 100a among batteries 100a-100d is exposed through opening 12. In other words, when loaded body housing device 10 is viewed in plan view, only storage space 21a among storage spaces 21a-21d is exposed through opening 12. Storage space 21a is one example of the exposed storage space. Note that hereinafter, there are also cases where storage spaces 21.a-21d will be collectively or without distinction referred to as storage space 21.

Furthermore, lower table 30 includes four storage spaces 31e-31h in which batteries 100e-100h are disposed. When loaded body housing device 10 is viewed in plan view, only battery 100e among batteries 100e-100h is exposed through opening 13. In other words, when loaded body housing device 10 is viewed in plan view, only storage space 31e among storage spaces 31e-31h is exposed through opening 13. Storage space 31e is one example of the exposed storage space. Note that hereinafter, there are also cases where storage spaces 31e-31h will be collectively or without distinction referred to as storage space 31.

Upper table 20 is disposed in such a position that when viewed in plan view, a portion of the plurality of storage spaces 21 (21a-21d) overlaps with a portion of the plurality of storage spaces 31 (31e-31h) on lower table 30 and the plurality of storage spaces 21 do not overlap with storage space 31e exposed through opening 13. FIG. 8 illustrates an example in which a portion of storage space 21a overlaps with a portion of storage space 31h and a portion of storage space 21d overlaps with a portion of storage space 31g. Note that when viewed in plan view, upper table 20 is disposed forward of lower table 30 (further in the positive direction of the Z-axis than lower table 30 is).

Assume that when viewed in plan view, the direction from rotation axis J1 of upper table 20 toward rotation axis J2 of lower table 30 is denoted as d1. Direction d1 is, for example, at an angle with respect to the Y-axis. In other words, direction d1 is not substantially parallel to the Y-axis. Note that direction d1 is one example of the second direction in which rotation axes J1, J2 are aligned when viewed in plan view.

Furthermore, assume that d2 is the direction from center C1 of storage space 21a exposed through opening 12 toward center C2 of storage space 31e exposed through opening 13 when viewed in plan view. Center C1 of storage space 21a is, for example, the center of gravity of storage space 21a when viewed in plan view (refer to storage space 21 in FIG. 6). Center C1 of storage space 21a is, for example, the center of gravity of battery 100a in plan view in FIG. 8. Center C2 of storage space 31e is, for example, the center of gravity of storage space 31e in plan view. Center C2 of storage space 31e is, for example, the center of gravity of battery 100e in plan view in FIG. 8. Direction d2 is one example of the third direction in which storage spaces 21a, 31e exposed through openings 12, 13 are aligned when viewed in plan view. Direction d2 is, for example, substantially parallel to the Y-axis.

As described above, direction d1 intersects with direction d2 when viewed in plan view. In other words, the virtual line connecting rotation axis J1 and center C1 and the virtual line connecting rotation axis J2 and center C2 intersect with each other. For example, when viewed in plan view, rotation axis J2 is located in the positive direction of the X-axis relative to rotation axis J1. Note that the positive direction of the X-axis is one example of the fourth direction. For example, the third direction and the fourth direction are substantially orthogonal to each other.

The situation in which directions d1, d2 intersect with each other when viewed in plan view is, in other words, a situation in which the virtual line connecting the center of wall portion 22c and rotation axis J1 and the virtual line connecting the center of wall portion 32c and rotation axis J2 intersect with each other. The center of wall portion 22c is, for example, a position on wall portion 22c that corresponds to the middle between wall portions 22b, 22d when viewed along the Y-axis, and is center C3 indicated in FIG. 6. The center of wall portion 32c is defined in the same manner.

As described above, loaded body housing device 10 houses upper table 20, which is disposed forward, and lower table 30, which is disposed backward of upper table 20, when viewed in plan view so that lower table 30 is disposed further in the positive direction of the X-axis (that is, on the side on which a user is located) than upper table 20 is. In other words, loaded body housing device 10 houses upper table 20 and lower table 30 so that lower table 30, which is disposed at a lower position than upper table 20 relative to the installation surface, is positioned in the positive direction of the X-axis relative to upper table 20, which is disposed at a higher position than lower table 30 relative to the installation surface. When viewed in plan view, each of the plurality of storage spaces 21 is disposed in a position that does not overlap with storage space 31e exposed through opening 13.

Note that as illustrated in FIG. 8, direction d1 is at an angle with respect to a line parallel to the Y-axis, and direction d2 is substantially parallel to the Y-axis. In other words, the positions of rotation axes J1, J2 along the X-axis are different, but the positions of storage space 21a (for example, center C1) and storage space 31e (for example, center C2) along the X-axis are substantially the same. This is because the positions of the storage spaces on upper table 20 and lower table 30 with respect to the rotation axes are different when viewed in plan view. The position of the storage space with respect to the rotation axis will be described with reference to FIG. 9.

Figure 9:
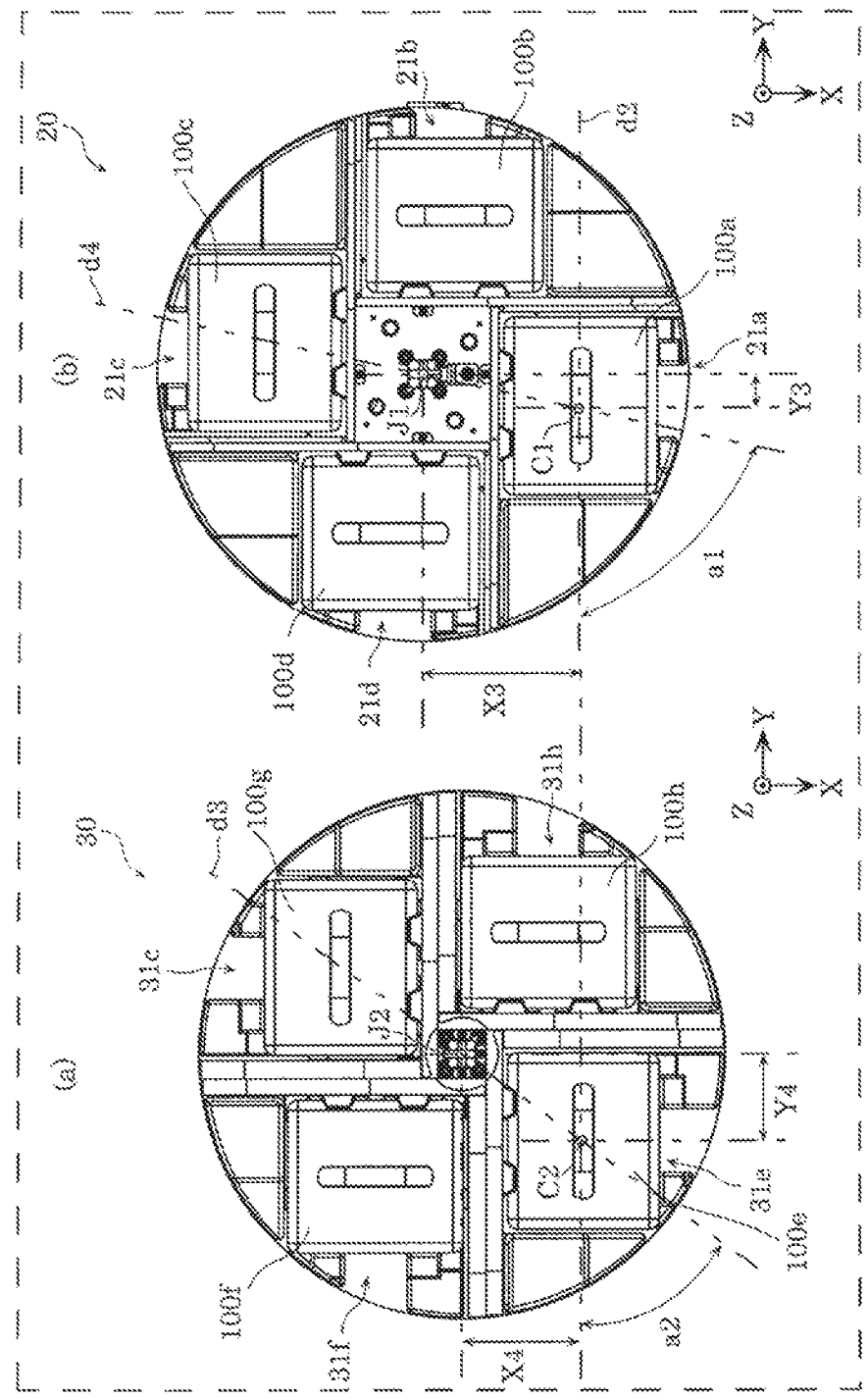
FIG. 9 illustrates the positional relationship of storage spaces on an upper table and a lower table according to an embodiment.

FIG. 9 illustrates the positional relationship between storage space 21 on upper table 20 and storage space 31 on lower table 30 according to the present embodiment. Specifically, (a) in. FIG. 9 is a plan view illustrating lower table 30, and (b) in FIG. 9 is a plan view illustrating upper table 20. Upper table 20 and lower table 30 illustrated in (a) and (b) in FIG. 9 are those in FIG. 8 that have moved along the Y-axis so that upper table 20 and lower table 30 do not overlap with each other.

As illustrated in (a) and (b) in FIG. 9, the positions of the plurality of storage spaces 21 relative to rotation axis J1 and the positions of the plurality of storage spaces 31 relative to rotation axis J2 are different. When the angle formed between direction d2 and direction d3 from rotation axis J2 toward center C2 of storage space 31e is referred to as angle a2 as illustrated in (a) in FIG. 9, and the angle formed between d2 and direction d4 from rotation axis J1 toward center C1 of storage space 21a is referred to as angle at as illustrated in (b) in FIG. 9, angle a1 is greater than angle a2. Note that the angle herein means an angle of at most 90 degrees.

For example, if upper table 20 and lower table 30 are disposed so that rotation axes J1, J2 overlap with each other, storage space 31e exposed through opening 13 and storage space 21a exposed through opening 12 are disposed in an area defined by the negative direction of the Y-axis and the negative direction of the X-axis.

Distance X4 between rotation axis J2 and center C2 of storage space 31.e along the X-axis is less than distance X3 between rotation axis J1 and center C1 of storage space 21a along the X-axis. Distance X4 is the shortest distance between direction d2 and a virtual line passing though rotation axis J2 and extending parallel to the Y-axis, and distance X3 is the shortest distance between direction d2 and a virtual line passing through rotation axis J1 and extending parallel to the Y-axis. Storage space 31e on lower table 30 is disposed closer to the corresponding rotation axis along the X-axis than storage space 21a on upper table 20 is.

This is achieved by making the position of wall portion 22c relative to rotation axis J1 and the position of wall portion 32c relative to rotation axis J2 different from each other. Specifically, the distance between rotation axis J1 and wall portion 22c along the X-axis is greater than the distance between rotation axis J2 and wall portion 32c along the X-axis. For example, as illustrated in FIG. 8, wall portion 22c and wall portion 32c may be arranged in the same straight line when viewed in plan view. For example, wall portion 22c and wall portion 32c may be arranged in a straight line parallel to the Y-axis when viewed in plan view.

Thus, as illustrated in FIG. 8, even when lower table 30 is disposed in the positive direction of the X-axis relative to upper table 20, the position of storage space 21a exposed through opening 12 and the position of storage space 31e exposed through opening 13 can be made substantially the same along the X-axis. Therefore, two batteries 100 are disposed in positions that are substantially the same distance away from a user along the X-axis, allowing a user to easily take out two batteries 100 from loaded body housing device 10.

Distance Y4 between rotation axis J2 and center C2 of storage space 31e along the Y-axis is greater than distance Y3 between rotation axis J1 and center C1 of storage space 21a along the Y-axis. Distance Y4 is the shortest distance between a virtual line passing though rotation axis J2 and extending parallel to the X-axis and a virtual line passing though center C2 and extending parallel to the X-axis, and distance Y3 is the shortest distance between a virtual line passing though rotation axis J1 and extending parallel to the X-axis and a virtual line passing though center C1 and extending parallel to the X-axis. Storage space 31e on lower table 30 is disposed farther away from the corresponding rotation axis along the Y-axis than storage space 21a on upper table 20 is. In other words, storage space 31e is disposed in a direction away from upper table 20 when viewed along the Y-axis.

This is achieved by making the position of wall portion 22d relative to rotation axis J1 and the position of wall portion 32d relative to rotation axis J2 different from each other. Specifically, the distance between rotation axis 31 and wall portion 22d along the Y-axis is less than the distance between rotation axis J2 and wall portion 32d along the Y-axis.

Thus, as illustrated in FIG. 8, upper table 20 can be disposed in a position located further in the negative direction of the Y-axis without overlapping with storage space 31e exposed through opening 13. For example, upper table 20 may be disposed in a position overlapping with rotation axis J2 of lower table 30 when viewed in plan view.

As illustrated in (a) in FIG. 9, the plurality of storage spaces 31 are disposed around rotation axis J2. Specifically, the plurality of storage spaces 31 are positioned in rotational symmetry about rotation axis J2. Thus, when lower table 30 rotates about rotation axis J2, each of the plurality of storage spaces 31 can be placed at the same position relative to opening 13.

As illustrated in (b) in FIG. 9, the plurality of storage spaces 21 are disposed around rotation axis J1. Specifically, the plurality of storage spaces 21 are positioned in rotational symmetry about rotation axis J1. Thus, when upper table 20 rotates about rotation axis 31, each of the plurality of storage spaces 21 can be placed at the same position relative to opening 12.

Note that as illustrated in (a) and (b) in FIG. 9, when viewed in plan view, upper table 20 and lower table 30 have substantially circular external shapes and are of substantially the same size, as an example.

[1-3. Configuration of Shutter]

Next, shutter 14 which opens and closes opening 12 and shutter 15 which opens and closes opening 13 will be described with reference to FIG. 10.

Figure 10:
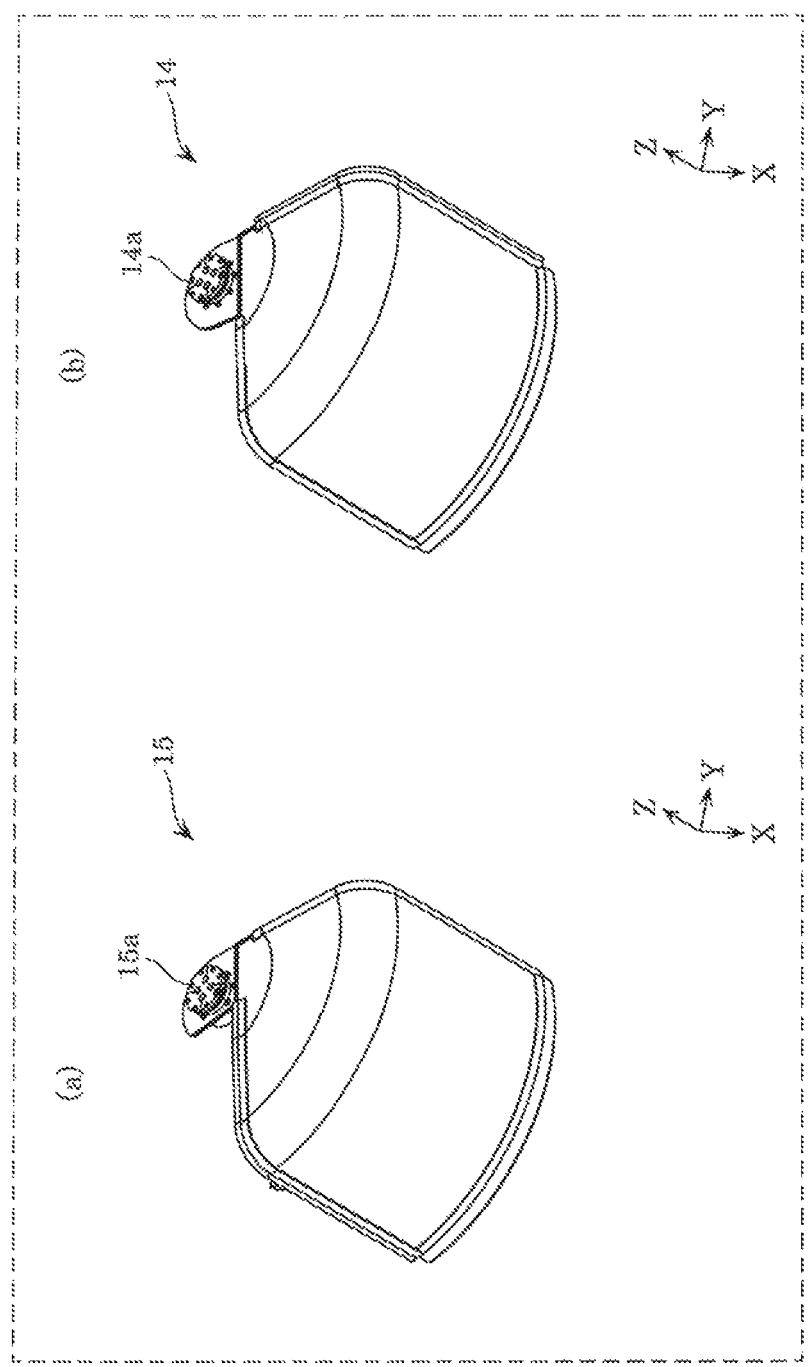
FIG. 10 is an external perspective view of a shutter according to an embodiment.

FIG. 10 is an external perspective view of shutters 14, 15 according to the present embodiment. Shutter 15 which opens and closes opening 13 is illustrated in (a) in FIG. 10, and shutter 14 which opens and closes opening 12 is illustrated in (b) in FIG. 10. Note that illustration of a motor which rotates shutters 14, 15 and a supporter (for example, a plurality of wheels) which rotatably supports shutters 14, 15 are omitted in (a) and (b) in FIG. 10.

As illustrated in (a) in FIG. 10, shutter 15 includes bearing 15a in the positive direction of the Z-axis and rotates about an axis passing through bearing 15a and extending parallel to the Z-axis as a rotation axis. Bearing 15a is fixed to a portion of casing 11, for example. Shutter 15 is formed to cover opening 13 and has the shape of an approximately one-fourth cut portion of a pot, for example.

As illustrated in (b) in FIG. 10, shutter 14 includes bearing 14a in the positive direction of the Z-axis and rotates about an axis passing through bearing 14a and extending parallel to the Z-axis as a rotation axis. Bearing 14a is fixed to a portion of casing 11, for example. Shutter 14 is formed to cover opening 12 and has the shape of an approximately one-fourth cut portion of a pot, for example.

[2. Operations of Loaded Body Housing Device]

Subsequently, operations of loaded body housing device 10 will be described with reference to FIG. 11. Specifically, movement of shutters 14, 15 will be described.

Figure 11:
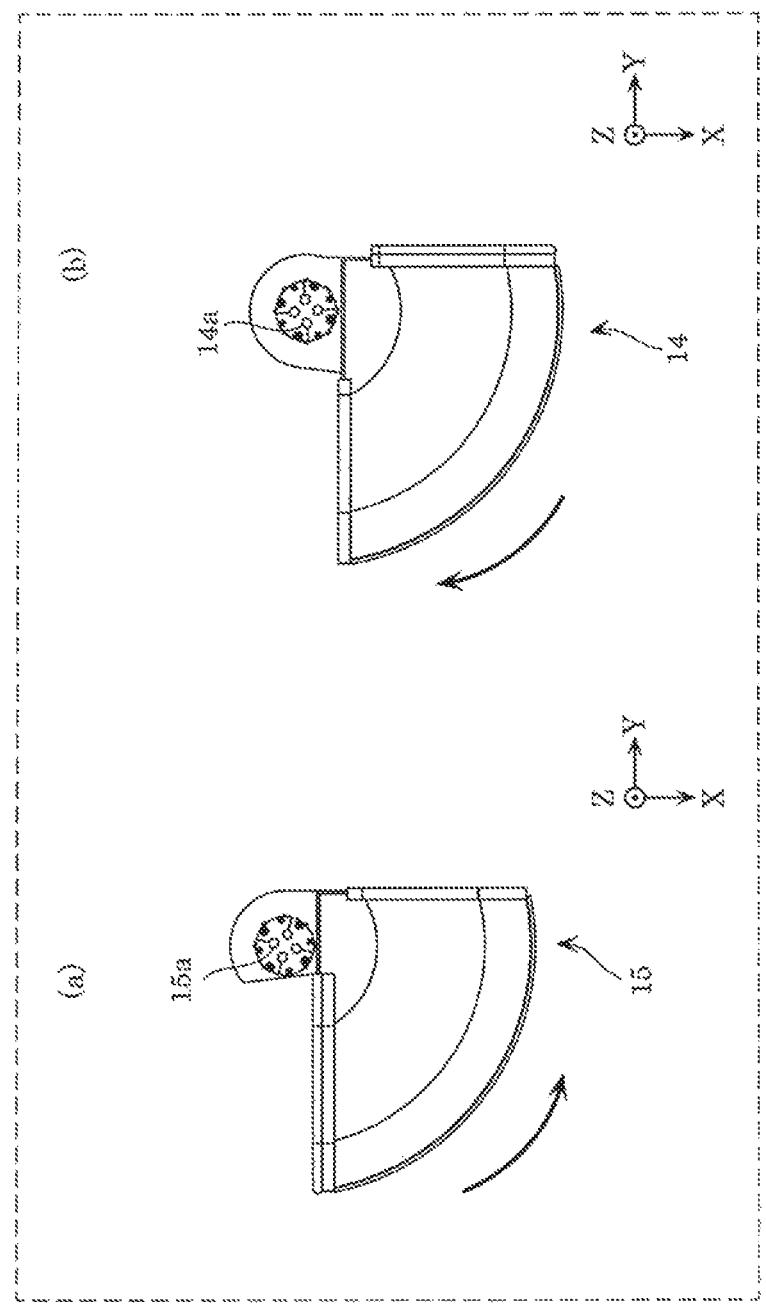
FIG. 11 is a plan view illustrating an example of movement of a shutter according to an embodiment.

FIG. 11 is a plan view illustrating an example of the movement of shutters 14, 15 according to the present embodiment. Specifically, (a) in FIG. 11 illustrates the operation of shutter 15 which opens and closes opening 13, and (b) in FIG. 11 illustrates the operation of shutter 14 which opens and closes opening 12. Shutters 14, 15 illustrated in (a) and (b) in FIG. 11 are those taken out from loaded body housing device 10 illustrated in FIG. 2, in which shutters 14, 15 are closed, and arranged in a non-overlapping manner. In other words, (a) in FIG. 11 illustrates shutter 15 by which opening 13 is closed, and (b) in FIG. 11 illustrates shutter 14 by which opening 12 is closed.

As illustrated in (a) in FIG. 11, the motor causes shutter 15 to rotate counterclockwise (in the direction of the arrow in the figure) around bearing 15a as a rotation axis to open shutter 15. The motor causes shutter 15 to rotate clockwise to close opening 13.

As illustrated in (b) in FIG. 11, the motor causes shutter 14 to rotate clockwise (in the direction of the arrow in the figure) around bearing 14a as a rotation axis to open shutter 14. The motor causes shutter 14 to rotate counterclockwise to close opening 12. In other words, controller 40 controls shutters 14 and 15 so that shutters 14 and 15 rotate in opposite directions.

As described above, the motor causes shutter 14 to move so that shutter 14 is housed in loaded body housing device 10, and the motor causes shutter 15 to move so that shutter 15 is housed in loaded body housing device 10. In other words, when viewed in plan view, shutters 14, 15 move so that shutters 14, 15 are housed at positions on the outer edge of loaded body housing device 10 that are far away from the outer edge substantially orthogonal to the Y-axis.

[3. Advantageous Effects, Etc.]

As described above, the loaded body housing device according to the present embodiment includes: upper table 20 which rotates about rotation axis J1 extending along the negative direction of the Z-axis and supports the plurality of batteries 100 in the plurality of storage spaces 21 around rotation axis J1; lower table 30 which rotates about rotation axis J2 extending along the negative direction of the Z-axis and supports a plurality of batteries 100 in the plurality of storage spaces 31 around rotation axis J2; and casing 11 which houses upper table 20 and lower table 30 and has opening 12 through which one of the plurality of storage spaces 21 is exposed when viewed in the negative direction of the Z-axis and opening 13 through which one of the plurality of storage spaces 31 is exposed when viewed in the negative direction of the Z-axis. Upper table 20 is positioned to have overlapping between a part of the plurality of storage spaces 21 and the plurality of storage spaces 31 and have no overlapping between the plurality of storage spaces 21 and storage space 31e exposed through opening 13 when viewed in the negative direction of the Z-axis, and direction d1 in which rotation axes J1, J2 are arranged intersects with direction d2 in which storage space 21a exposed through opening 12 and storage space 31e exposed through opening 13 are arranged when viewed in the negative direction of the Z-axis.

Thus, when viewed in the negative direction of the Z-axis, each of the storage spaces can be exposed through openings 12, 13. In other words, batteries 100 positioned in the storage spaces can be exposed, allowing a user to take out two batteries 100 at the same time. Furthermore, since directions d1, d2 intersect with each other, upper table 20 and lower table 30 can be disposed closer to each other than those in the case where directions d1, d2 are parallel to each other. Specifically, the distance between each of rotation axes J1, J2 and a line parallel to direction d2 can be reduced. In other words, the length of loaded body housing device 10 in the direction parallel to direction d2 can be reduced. Therefore, it is possible to provide downsized loaded body housing device 10 from which two batteries 100 can be taken out. For example, two or more loaded body housing devices 10 are advantageously arranged side by side along direction d2.

Furthermore, the loaded body is a rechargeable battery, and loaded body housing device 10 further includes connector 50 which is disposed in each of the plurality of storage spaces 21 and the plurality of storage spaces 31 and charges the loaded body disposed in storage spaces 21, 31 by supplying electricity thereto.

With this, when a rechargeable battery (for example, battery 100) that is low on charge is disposed in storage space 21, 31, the rechargeable battery can be charged.

Furthermore, each of the plurality of batteries 100 has a substantially cuboid external shape, the plurality of storage spaces 21 are positioned in rotational symmetry about rotation axis J1, and the plurality of storage spaces 31 are positioned in rotational symmetry about rotation axis J2.

With this, when upper table 20 rotates about rotation axis J1, each of the plurality of storage spaces 21 can be disposed in substantially the same position relative to opening 12. When lower table 30 rotates about rotation axis J2, each of the plurality of storage spaces 31 can be disposed in substantially the same position relative to opening 13. In other words, even when upper table 20 and lower table 30 rotate, a user can take out battery 100 placed in substantially the same position. Thus, a user can easily take out battery 100.

Furthermore, when viewed in the negative direction of the Z-axis, opening 12 is positioned to expose, among the plurality of storage spaces 21, storage space 21a located on upper table 20 in direction d2 and a direction (fourth direction) orthogonal to direction d2, and when viewed in the negative direction of the Z-axis, opening 13 is positioned to expose, among the plurality of storage spaces 31, storage space 31e located on lower table 30 in direction d2 and the fourth direction.

Thus, the storage spaces located at substantially the same position on upper table 20 and lower table 30 can be exposed through openings 12, 13. In other words, the distance between storage space 21a exposed through opening 12 and storage space 31e exposed through opening 13 along the Y-axis can be reduced. This allows a user to easily, simultaneously take out batteries 100 exposed through openings 12, 13.

Furthermore, upper table 20 is disposed forward of lower table 30 when viewed in the negative direction of the Z-axis, and rotation axis J2 is located further in direction d3 than rotation axis J1 is when viewed in the negative direction of the Z-axis.

Thus, when viewed in the negative direction of the Z-axis, storage space 31e exposed through opening 13 among the plurality of storage spaces 31 on lower table 30 can be kept from overlapping with upper table 20. Accordingly, upper table 20 can be disposed closer to lower table 30, making it possible to further downsize loaded body housing device 10.

Furthermore, when viewed in the negative direction of the Z-axis, angle a1 formed between direction d2 and direction d4 connecting rotation axis J1 and center C1 of storage space 21a exposed through opening 12 is greater than angle a2 formed between direction d2 and direction d3 connecting rotation axis J2 and center C2 of storage space 31e exposed through opening 13.

Thus, for example, distance X3 between rotation axis J1 and center C1 of storage space 21a along the X-axis is greater than distance X4 between rotation axis J2 and center C2 of storage space 31e along the X-axis. In other words, storage space 21a is disposed further in the positive direction of the X-axis than storage space 31e is with respect to the rotation axis. For example, even when rotation axis J2 is located in the positive direction of the X-axis relative to rotation axis J1, the positions of storage spaces 21a, 31e along the X-axis can be substantially the same. This allows a user to more easily, simultaneously take out battery 100 disposed in storage space 21a and battery 100 disposed in storage space 31e.

Furthermore, distance Y4 between rotation axis J2 and center C2 of storage space 31e along the Y-axis is greater than distance Y3 between rotation axis J1 and center C1 of storage space 21a along the Y-axis. In other words, storage space 31e is disposed further in the negative direction of the Y-axis than storage space 21a is with respect to the rotation axis, and thus upper table 20 can be disposed in a position located further in the negative direction of the Y-axis (closer to lower table 30). This makes it possible to further downsize loaded body housing device 10.

Furthermore, opening 12 is larger than opening 13 when viewed in the negative direction of the Z-axis.

Thus, opening 13 can be kept from becoming unnecessarily large on lower table 30 on which storage space 31e is disposed further in the negative direction of the Y-axis than storage space 21a is with respect to the rotation axis. This makes it possible to further downsize loaded body housing device 10.

Furthermore, upper table 20 is disposed in a position that does not overlap with opening 13 when viewed in the negative direction of the Z-axis.

Thus, it is possible to reduce the increase in difficulty in taking out battery 100 disposed in storage space 31e located at opening 13.

Furthermore, opening 12 exposes a surface facing the positive direction of the X-axis among surfaces of battery 100a disposed in storage space 21a exposed through opening 12, and opening 13 exposes a surface facing the positive direction of the X-axis among surfaces of battery 100e disposed in storage space 31e exposed through opening 13.

Thus, a user can take out batteries 100a, 100e by tilting batteries 100a, 100e forward instead of lifting up batteries 100a, 100e in a direction parallel to the positive direction of the Z-axis. Furthermore, a user can tilt and place batteries in storage spaces 21.a, 31e. This allows a user to easily take out and place batteries, improving convenience.

Furthermore, loaded body housing device 10 further includes: shutter 14 which is movable along the perimeter of upper table 20 and opens and closes opening 12; and shutter 15 which is movable along the perimeter of lower table 30 and opens and closes opening 13.

Thus, when batteries 100 are not being replaced, openings 12, 13 can be closed by shutters 14, 15. This improves the safety of loaded body housing device 10. Furthermore, as a result of both shutters 14, 15 being opened, a user can take out two batteries 100 at the same time.

Furthermore, upper table 20 has, at a position surrounded by the plurality of storage spaces 21 when viewed in the negative direction of the Z-axis, through-hole 23 through which wiring for supplying electricity to battery 100 disposed in storage space 21 is inserted, and lower table 30 has, at a position surrounded by the plurality of storage spaces 31 when viewed in the negative direction of the Z-axis, through-hole 33 through which wiring for supplying electricity to battery 100 disposed in storage space 31 is inserted.

Thus, it is no longer necessary to provide a space for allowing passage of wiring for charging battery 100 separately from upper table 20 and lower table 30. This makes it possible to further downsize loaded body housing device 10.

Furthermore, upper table 20 and lower table 30 have circular external shapes and are equal in size when viewed in the negative direction of the Z-axis.

Thus, it is possible to reduce creation of an unnecessary space on upper table 20 or lower table 30 when viewed in plan view.

Furthermore, upper table 20 is disposed in a position that overlaps with rotation axis J2 of lower table 30 when viewed in the negative direction of the Z-axis.

This makes it possible to further downsize loaded body housing device 10.

OTHER EMBODIMENTS

Although the loaded body housing device according to the embodiment has been described above by way of the embodiment, the present disclosure is not limited to the above embodiment.

Therefore, the structural elements described in the accompanying drawings and detailed description may include, not only structural elements essential to solving the problem, but also structural elements that are not essential to solving the problem but are included in order to exemplify the aforementioned technique. As such, description of these non-essential structural elements in the accompanying drawings and the detailed description should not be taken to mean that these non-essential structural elements are essential.

Aside from the above, forms obtained by various modifications to the above-described embodiment that can be conceived by a person of skill in the art as well as forms realized by arbitrarily combining structural elements and functions in the embodiment which are within the scope of the essence of the present disclosure are included in the present disclosure.

For example, the above embodiment describes an example in which the first rotating body and the second rotating body are tables (specifically, upper table 20 and lower table 30), but the shapes of the first rotating body and the second rotating body are not limited to the tables as long as the first rotating body and the second rotating body are capable of supporting the plurality of batteries 100. The first rotating body and the second rotating body may include: a columnar body; and a wall portion projecting outward from the columnar body, and battery 100 may be supported on the wall portion. Furthermore, if the columnar body itself is capable of supporting battery 100, each of the first rotating body and the second rotating body may be formed of the columnar body. In other words, each of the first rotating body and the second rotating body is not required to include a bottom portion.

The above embodiment describes an example in which loaded body housing device 10 houses battery 100 as a loaded body, but there is no limitation on what is housed in loaded body housing device 10. Loaded body housing device 10 may house an object having a weight that can be carried by a person. For example, loaded body housing device 10 may house, as a loaded body, a polyethylene tank storing kerosene or a container storing water. In the case where the loaded body is a polyethylene tank, the connector may supply the polyethylene tank with kerosene, and in the case where the loaded body is a container storing water, the connector may supply the container with water, for example.

The above embodiment describes an example in which identical batteries 100 (for example, batteries of the same size) are disposed on upper table 20 and lower table 30, but this is not limiting. Batteries of different types may be disposed on upper table 20 and lower table 30. For example, batteries of different shapes in plan view may be housed in upper table 20 and lower table 30. Note that in this case, storage space 21 and storage space 31 are formed on upper table 20 and lower table 30, respectively, according to the shape of a battery that is housed.

The above embodiment describes an example in which upper table 20 is disposed forward of lower table 30 when an area located in the negative direction of the Z-axis is viewed from an area located in the positive direction of the Z-axis, but this is not limiting. For example, when an area located in the negative direction of the Z-axis is viewed from an area located in the positive direction of the Z-axis, lower table 30 may be disposed forward of upper table 20.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure can be applied to a loaded body housing device that houses a battery mounted on an electric vehicle.

What is claimed is:
1. A loaded body housing device, comprising:
a first rotating body which rotates about a first rotation axis extending along a first direction and supports a plurality of loaded bodies in a plurality of first storage spaces around the first rotation axis;
a second rotating body which rotates about a second rotation axis extending along the first direction and supports a plurality of loaded bodies in a plurality of second storage spaces around the second rotation axis; and
a casing which houses the first rotating body and the second rotating body, the casing having a first opening through which one first storage space of the plurality of first storage spaces is exposed when viewed in the first direction and a second opening through which one second storage space of the plurality of second storage spaces is exposed when viewed in the first direction, wherein the first rotating body is positioned to have overlapping between a part of the plurality of first storage spaces and the plurality of second storage spaces and have no overlapping between the plurality of first storage spaces and a second storage space exposed through the second opening when viewed in the first direction, and a second direction in which the first rotation axis and the second rotation axis are arranged intersects with a third direction in which a first storage space exposed through the first opening and the second storage space exposed through the second opening are arranged when viewed in the first direction.

2. The loaded body housing device according to claim 1, wherein each loaded body of the plurality of loaded bodies is a rechargeable battery, and the loaded body housing device further comprises:

a connector which is disposed in each storage space of the plurality of first storage spaces and the plurality of second storage spaces and charges a corresponding loaded body of the plurality of loaded bodies disposed in the plurality of first storage spaces and the plurality of second storage spaces by supplying electricity to said corresponding loaded body.

3. The loaded body housing device according to claim 1, wherein each loaded body of the plurality of loaded bodies has a substantially cuboid external shape, the plurality of first storage spaces are positioned in rotational symmetry about the first rotation axis, and the plurality of second storage spaces are positioned in rotational symmetry about the second rotation axis.

4. The loaded body housing device according to claim 1, wherein when viewed in the first direction, the first opening is positioned to expose, among the plurality of first storage spaces, a first storage space located on the first rotating body in the third direction and a fourth direction orthogonal to the third direction, and when viewed in the first direction, the second opening is positioned to expose, among the plurality of second storage spaces, a second storage space located on the second rotating body in the third direction and the fourth direction.

5. The loaded body housing device according to claim 4, wherein the first rotating body is disposed forward of the second rotating body when viewed in the first direction, and the second rotation axis is located further in the fourth direction than the first rotation axis is when viewed in the first direction.

6. The loaded body housing device according to claim 5, wherein when viewed in the first direction, an angle formed between the third direction and a direction connecting the first rotation axis and a center of the first storage space exposed through the first opening is greater than an angle formed between the third direction and a direction connecting the second rotation axis and a center of the second storage space exposed through the second opening.

7. The loaded body housing device according to claim 6, wherein the first opening is larger than the second opening when viewed in the first direction.

8. The loaded body housing device according to claim 5, wherein the first rotating body is disposed in a position that does not overlap with the second opening when viewed in the first direction.

9. The loaded body housing device according to claim 4, wherein the first opening exposes a surface facing the fourth direction among surfaces of each loaded body of the plurality of loaded bodies that is disposed in the first storage space exposed through the first opening, and the second opening exposes a surface facing the fourth direction among surfaces of each loaded body of the plurality of loaded bodies that is disposed in the second storage space exposed through the second opening.

10. The loaded body housing device according to claim 1, further comprising:

a first shutter which is movable along a perimeter of the first rotating body and opens and closes the first opening; and a second shutter which is movable along a perimeter of the second rotating body and opens and closes the second opening.

11. The loaded body housing device according to claim 1, wherein the first rotating body has, at a position surrounded by the plurality of first storage spaces when viewed in the first direction, a through-hole through which wiring for supplying electricity to the plurality of loaded bodies disposed in the plurality of first storage spaces is inserted, and the second rotating body has, at a position surrounded by the plurality of second storage spaces when viewed in the first direction, a through-hole through which wiring for supplying electricity to the plurality of loaded bodies disposed in the plurality of second storage space is inserted.

12. The loaded body housing device according to claim 1, wherein the first rotating body and the second rotating body have circular external shapes and are equal in size when viewed in the first direction.

13. The loaded body housing device according to claim 12, wherein the first rotating body is disposed in a position that overlaps with the second rotation axis of the second rotating body when viewed in the first direction.

* * * * *